United States Patent
Tsai et al.

(10) Patent No.: US 6,188,801 B1
(45) Date of Patent: *Feb. 13, 2001

(54) METHOD AND APPARATUS FOR AUTOMATIC IMAGE CALIBRATION FOR AN OPTICAL SCANNER

(76) Inventors: Jenn-Tsair Tsai; Bill Chen, both of No. 25, R&D RD. 2, Science-Based Industrial Park, Hsinchu (TW)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/144,495

(22) Filed: Aug. 31, 1998

(51) Int. Cl.$^7$ .................................................. G06K 9/32
(52) U.S. Cl. ...................... 382/294; 382/293; 382/305; 382/289
(58) Field of Search ................................ 382/294, 287, 382/289, 293, 295, 296, 151, 305, 173, 321; 358/474, 505, 504

(56) References Cited

U.S. PATENT DOCUMENTS

| | | | |
|---|---|---|---|
| 4,926,489 | * 5/1990 | Danielson et al. | 382/8 |
| 5,185,673 | * 2/1993 | Sobol | 358/296 |
| 5,313,311 | * 5/1994 | Brandkamp | 358/474 |
| 5,506,918 | * 4/1996 | Ishitani | 382/289 |
| 5,517,587 | * 5/1996 | Baker et al. | 382/296 |
| 5,818,976 | * 10/1998 | Pasco et al. | 382/289 |
| 5,854,854 | * 12/1998 | Cullen et al. | 382/176 |
| 5,870,508 | * 2/1999 | Park | 382/289 |
| 5,870,509 | * 2/1999 | Alcorn | 382/293 |
| 5,956,473 | * 9/1999 | Ma et al. | 395/182.03 |
| 5,987,191 | * 11/1999 | Suzuki | 382/294 |

* cited by examiner

*Primary Examiner*—Bhavesh Mehta
*Assistant Examiner*—Kanji Patel
(74) *Attorney, Agent, or Firm*—Lowe, Hauptman, Gilman & Berner, LLP

(57) ABSTRACT

A memory is divided into several blocks in advance for storing calibrated pixels in sequence. Then, start to check each pixel row by row. The obliquity ratio of each pixel will be computed based on two referential blocks on the two sides of the calibration paper. The obliquity ratio will then divided by the length of one pixel. If the residue of the division is larger than half the length of the pixel, it indicates that that pixel is the beginning of next block. Following this rule, we can divide each row into several blocks. The skew pixels will be calibrated according to a first calibration procedure and a second calibration procedure. The calibrated pixels will be stored in the memory blocks in sequence according to their block numbers. After all the pixels of the same row have been calibrated, the calibrated pixels will be read from the memory blocks in sequence. The calibrated procedure repeats until each row of the image has been calibrated.

12 Claims, 5 Drawing Sheets

METHOD AND APPARATUS FOR AUTOMATIC IMAGE CALIBRATION FOR AN OPTICAL SCANNER

BACKGROUND OF THE INVENTION

A. Field of the Invention

The present invention relates to a method and apparatus for image calibration for an optical scanner, and especially to a method and apparatus which can automatically calibrate a skew image caused by the oblique displacement of the image sensor in an optical scanner.

B. Description of the Prior Art

The optical mechanism for a scanner uses an adjustment jig to tune the horizontal level, right and left positions, and focus for an image. The optical mechanism also includes a calibration paper for a charged couple device to read, thereby to calibrate scanned images. However, the optical mechanism is subjected to damages caused by improper use or handling in shipment. Consequently, the optical mechanism will shift and generate skew images as shown in FIG. 1. Refer to FIG. 1, the skew image indicated by coordinates of As(i,j) is in contrast to a normal coordinates indicated by coordinates of A(i,j). The front edge of the skew image can be detected by gray levels. For instance, in FIG. 1, the skew black line indicates the front edge of the skew image.

When the optical mechanism of a scanner is damaged, the image quality cannot be improved simply by fine-tuning. Moreover, there are various possible reasons for scanner to generate skew images. It would be very difficult to find a universal method for solving the occurrence of skew images for every scanner. Even if the scanner is sent back to customer service for repair, there is no guarantee that the occurrence of skew images will never happen again.

SUMMARY OF THE INVENTION

Accordingly, it is an object of the present invention to provide an intelligent optical scanner incorporated with an automatic calibration apparatus, which can automatically calibrate a skew image while being read into the image sensor, thereby to efficiently eliminate the occurrence of skew images.

It is another object of the present invention to provide a method and apparatus that can automatically calibrate a skew image caused by the oblique displacement of the optical mechanism, thereby to improve the image quality of a scanner and save the cost and efforts on maintenance.

These and other objects of the invention, which will become more apparent as the invention is described more fully below, are obtained by providing a method and apparatus for automatic image calibration. A memory is divided into several blocks in advance for storing calibrated pixels in sequence. Then, each pixel is checked row by row. The obliquity ratio of each pixel will be computed based on two referential blocks on the two sides of the calibration paper. The obliquity ratio will then divided by the length of a pixel. If the residue of the division is larger than half the length of the pixel, it indicates that that pixel is the beginning of next block. Following this rule, we can divide each row into several blocks. The skew pixels will be calibrated according to a first calibration procedure and a second calibration procedure. The calibrated pixels will be stored in the memory blocks in sequence according to their block numbers. After all the pixels of the same row have been calibrated, the calibrated pixels will be read from the memory blocks in sequence. The calibrated procedure repeats until each row of the image has been calibrated.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is exemplary. Those skilled in the art will appreciate that changes can be made to the disclosed embodiment without departing from the spirit and scope of the invention.

Figure 1:
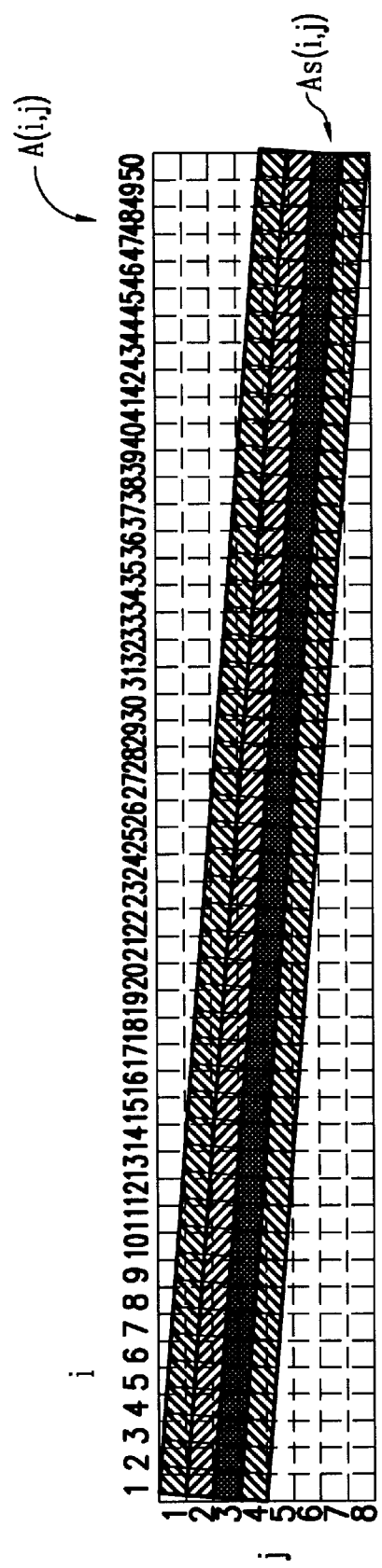
FIG. 1 is a schematic diagram of a scale-up skew image caused by an oblique displacement of the optical mechanism of a scanner.
Figure 2:
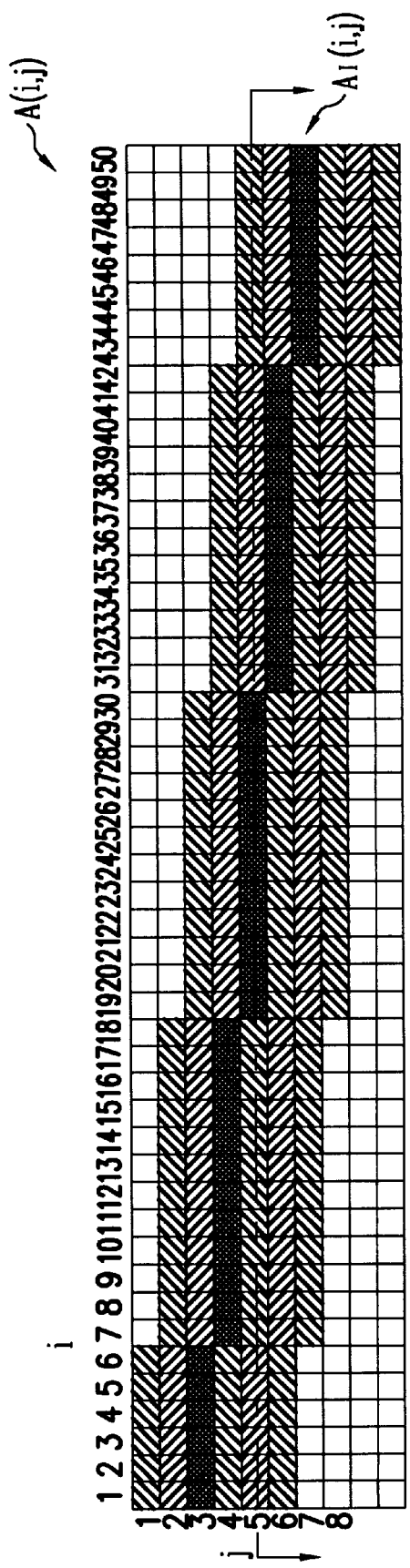
FIG. 2 is a schematic diagram of a scale-up skew image divided into several blocks according to the method of the present invention.

To solve the problem mentioned above, the present invention provides an intelligent automatic image calibration method and apparatus. Refer to FIG. 2 for illustrating the block division method according to the invention. Let the coordinates of the normal image be $A(i,j)$, the skew image $As(i,j)$ and the calibrated image $AI(i,j)$ where i and j represent the indices for X axis and Y axis respectively. The calibrated pixel on $AI(i,j)$ should be: $As(i,j)=A(i,j)$, or $As(i,j) \approx A(i,j)$. However, if the obliquity of the image is very serious, the obliquity for a skew pixel may exceed one or more pixels. In such cases, we have to group pixels according to their obliquity ratio by blocks. For instance, when the obliquity ratio of the two adjacent pixels $A(i,j)$ and $A(i+1,j)$ is larger than one pixel, the pixel on $A(i+1,j)$ will be defined as the initial pixel of next block. The same procedure repeats until all the pixels on the same row have been grouped into blocks. Accordingly, the skew image as illustrated in FIG. 2 will be divided into five blocks, i.e., 1~6, 7~18, 19~30, 31~42, and 43~50. To determine the starting row for displaying the calibrated image, we will take the mean value of j of the first pixel and the last pixel of the first row. That is, $(1+8)/2=4.5$. So, the calibrated image will be displayed starting from the fifth row.

To store the calibrated pixels, we have to divide a memory into several blocks in advance. Then, we will use two black blocks on the two sides of the calibration paper for referential coordinates to compute the obliquity ratio h of the skew pixel. The obliquity ratio h is computed by the equation: $h = l \tan \alpha$, where l is the length of a pixel, and $\alpha$ the angle of the pixel.

Figure 3:
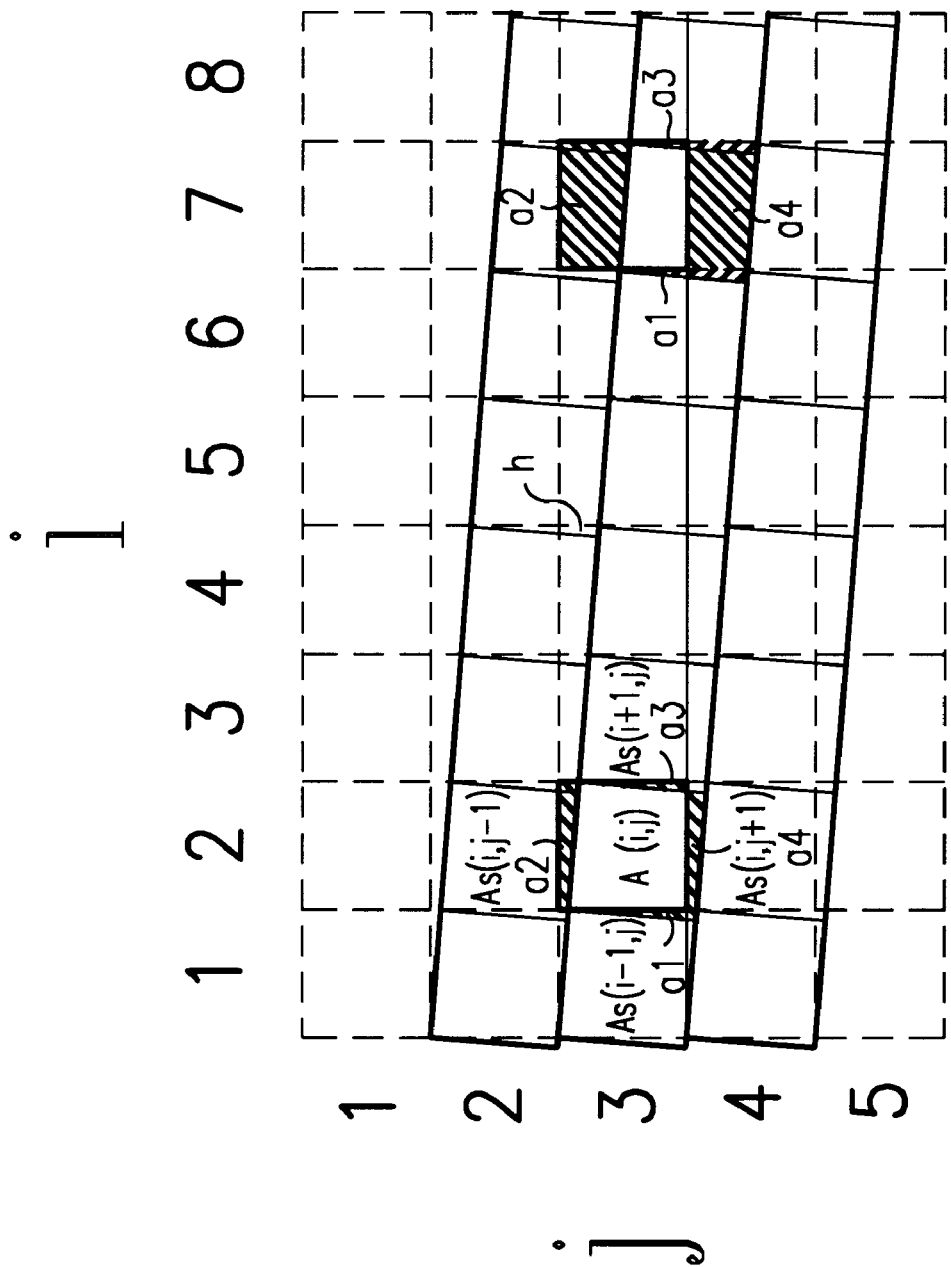
FIG. 3 is a schematic diagram of a further scale-up image showing the calibration method of the present invention.

Refer to FIG. 3 for illustrating the calibration method of the invention. FIG. 3 shows a further scale-up image of the first block of the first row of the skew image as shown in FIG. 2. The coordinates of a normal image are illustrated by dashed lines while the coordinates of a skew image are illustrated by solid lines. The shadow areas indicate the calibrated areas of a skew pixel.

The calibration method of the present invention is proceeded pixel by pixel and row by row in sequence. Generally, the coordinates of a skew pixel are compared with the coordinates of a normal pixel. The largest overlapped area for the skew pixel and the normal pixel will be the major portion of the calibrated pixel. The shadow areas surrounding the major portion of the calibrated pixel will be added to the major portion to form a complete calibrated pixel. For instance, take the pixel on As(2,3) for an example. The major portion of the pixel on As(2,3) is its center portion. The four shadow areas surrounding As(2,3) will be $a_1$, $a_2$, $a_3$, and $a_4$. If the obliquity of the pixel on As(i,j) is less than the length of one pixel, the area of the calibrated pixel will be equal to the sum of the area of the major portion plus the four shadow areas. The area computation for the calibrated pixel AI(i,j) will be: the portion of the pixel As(i,j) on A(i,j), plus the rest portions of As(i,j) on A(i,j). The computation is as follows:

$$AI(i,j)=[As(i,j)*((b^2-a_1-a_4)/b^2)]+[As(i,j-1)*(a_2/b^2)]+[As(i+1,j)*(a_3/b^2)] \quad (a),$$

where b is the length of the pixel.

As shown in FIG. 3, the calibrated pixel should locate on AI(i,j). The overlapped portion for the skew pixel As(i,j) and AI(i,j) includes the major portion in the middle part, and $a_2$ on the top, and $a_4$ at the bottom. Thus, the calibrated pixel shall be the sum of the major overlapped portion plus the rest areas of $a_1$, $a_2$, $a_3$, and $a_4$.

On the other hand, if the obliquity ratio divided by the length of a pixel has a residue larger than half the length of one pixel, the calibration will be different. For instance, take As(7,2) as an example. Since the overlapped area between As(7,2) and A(7,2) is less than the overlapped area between As(7,2) and A(7,3), so the major area for the calibrated pixel shall be on As(7,3) rather than on As(7,2). The computation will then be:

$$AI(i,j+1)=[As(i,j)*(a_4/b^2)]+[As(i,j+1)*(a_3/b^2)]+[A(i,j+1)*(a_2/b^2)] \quad (b)$$

Equations (a) and (b) suggest that the calibrated area for a skew pixel depend on its obliquity ratio. If the obliquity ratio of a pixel divided by the length of one pixel has a residue less than half the length of the pixel, then it indicates that the pixel is still on the same row with its previous pixel, so executing equation (a). However, if the residue is larger than half the length of the pixel, it indicates that the entire pixel is shift to new row. So, increments by 1 and execute equation (b). The calibration procedure continues until all pixels have been checked and calibrated.

During the process of calibration, whenever a pixel is calibrated, the calibrated pixel will be stored in a memory block according to its block number. When all the pixels on the same row have been calibrated, output the pixels from the memory block in sequence and according to their block number.

Figure 4:
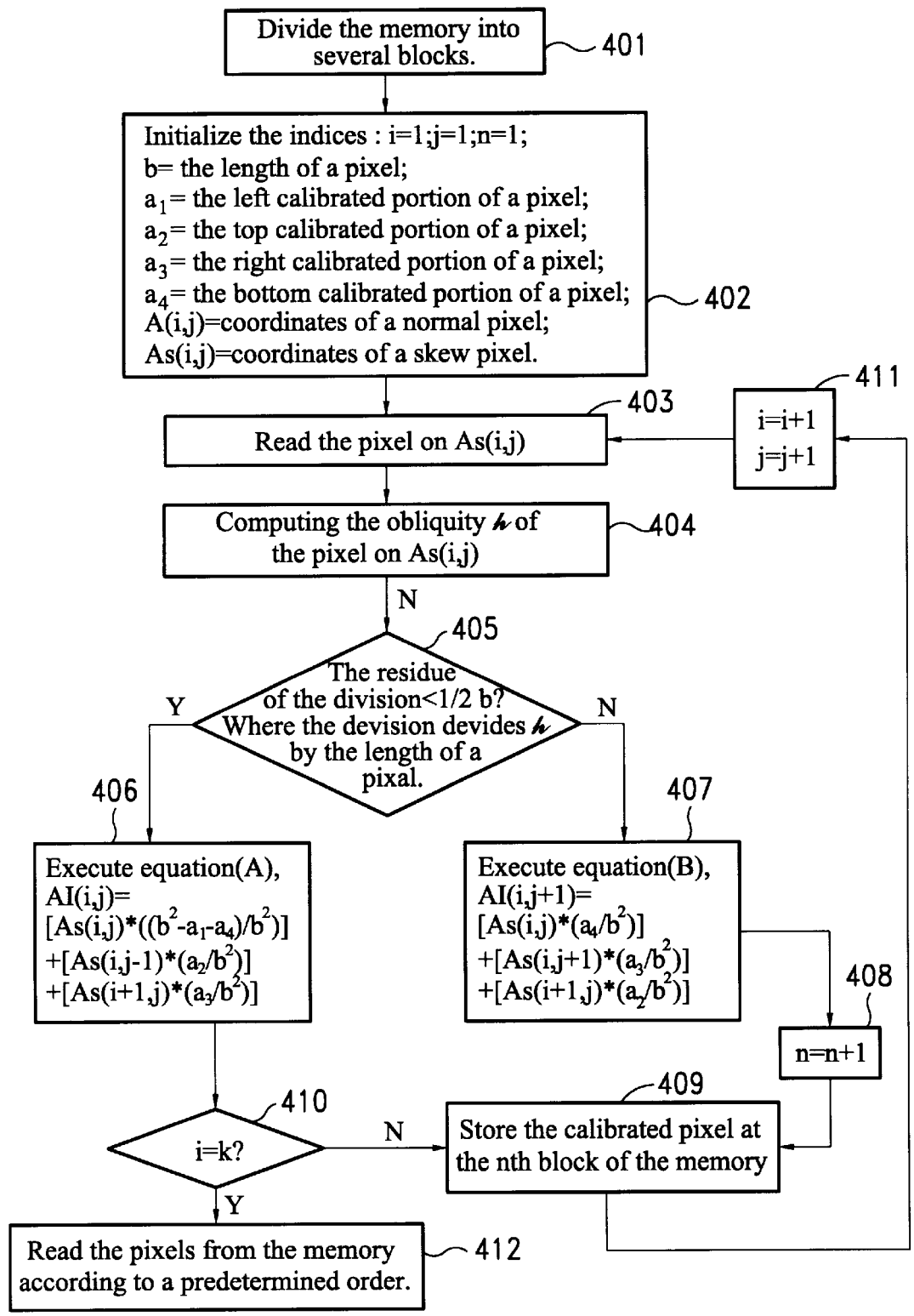
FIG. 4 is a flow chart showing the calibration method of the present invention.

Refer to FIG. 4 for the method of the present invention:

Step 401: Divide the memory into several blocks.

Step 402: Initialize the indices for the coordinates of X axis and Y axis. Let i=1; j=1; n=1 (n represents block number); b=the length of one pixel; $a_1$=the left calibrated portion of a pixel; $a_2$=the top calibrated portion of a pixel; $a_3$=the right calibrated portion of a pixel; $a_4$=the bottom calibrated portion of a pixel; A(i,j) represents the referential coordinates of a normal pixel; As(i,j) represents the referential coordinates of a skew pixel.

Step 403: Read the pixel on As(i,j) from the image.

Step 404: Use the blocks on the two sides of the calibration paper as referential coordinates for computing the obliquity ratio, h, of the pixel on As(i,j) where i=1, j=1. The obliquity h is computed following the equation: h=l tan α, where l is the length of a pixel and α the angle of the pixel.

Step 405: check whether the residue of the division is smaller than half the length of the pixel. If yes, go to step 406; otherwise, go to step 407.

Step 406: execute equation (A) to obtain the calibrated pixel AI(i,j), i.e., AI(i,j)=[As(i,j)*(($b^2-a_1-a_4$)/$b^2$)]+[As(i,j-1)*($a_2/b^2$)]+[As(i+1,j)*($a_3/b^2$)], then go step 410.

Step 407: execute equation (B) to obtain the calibrated area AI(i,j+1), i.e. AI(i,j+1)=[As(i,j)*($a_4/b^2$)]+[As(i,j+1)*($a_3/b^2$)]+[A(i,j+1)*($a_2/b^2$)].

Step 408: since it indicates that this is the beginning of next block, so increase n by 1, then execute step 409.

Step 409: Store the calibrated pixel at the nth block of the memory and execute step 411.

Step 410: check if the index i for X axis indicates the last pixel of the first row for the skew image. If yes, go to step 412. If not, go to step 409.

Step 411: increase index i and j by one, and then move to next row. And go to step 403.

Step 412: after all the pixels on the same row have been calibrated, read each pixel from the memory block in sequence according to its block number to form a calibrated image.

Figure 5:
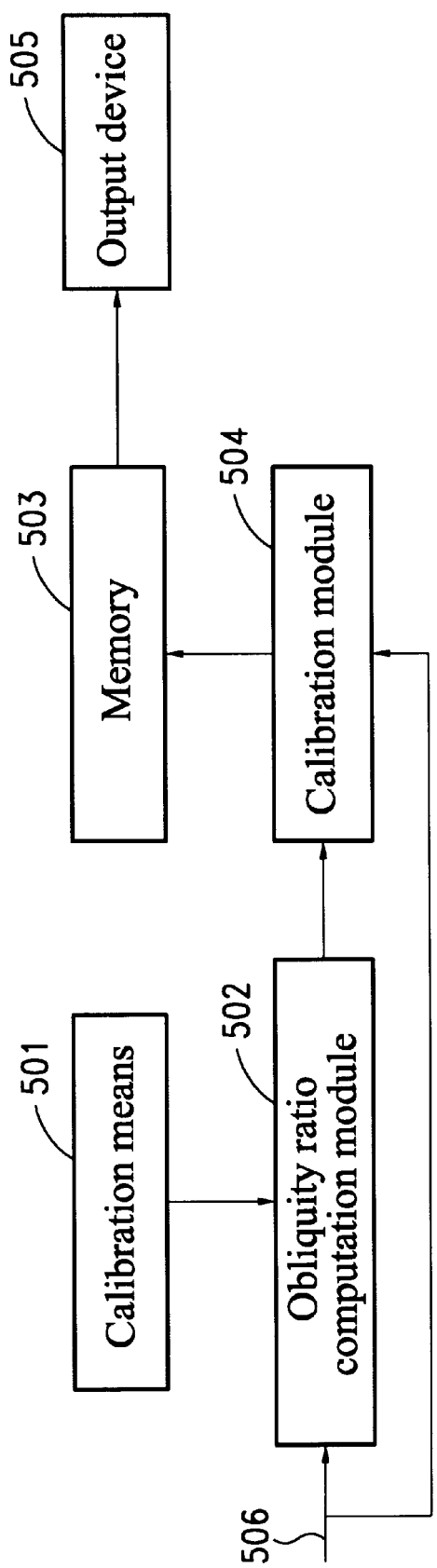
FIG. 5 is a schematic block diagram showing the apparatus of the present invention.

Based on the method mentioned above, the apparatus of the present invention is shown in FIG. 5. The calibration means 501 is a calibration paper with clear blocks on the sides for providing referential coordinates for a skew pixel. The obliquity calculation module 502 receives the coordinates information of a skew pixel 506 then outputs the obliquity ratio of the skew pixel according to the referential coordinates of the calibration means 501. Calibration module 504 reads the obliquity ratio from the obliquity ratio computation module 502 and gets the coordinates information of the skew pixel 506 to generate calibrated pixels. Calibration module 504 uses two equations to calculate the area of a calibrated pixel. equation (A): AI(i,j)=[As(i,j)*(($b^2-a_1-a_4$)/$b^2$)]+[As(i,j-1)*($a_2/b^2$)]+[As(i+1,j)*($a_3/b^2$)]. Equation (B): AI(i,j+1)=[As(i,j)*($a_4/b^2$)]+[As(i,j+1)*($a_3/b^2$)]+[A(i,j+1)*($a_2/b^2$)].

The calibrated pixels are then sent to memory 503. Memory 503 is divided into several blocks for storing the calibrated pixels in sequence according to their block numbers. As all the pixels on the same row have been calibrated, the output device 505 will read the calibrated pixels from the memory 503 in sequence according to their block numbers and then output a calibrated image.

It should be understood that various alternatives to the structures described herein might be employed in practicing the present invention. It is intended that the following claims define the invention and that the structure within the scope of these claims and their equivalents be covered thereby.

What is claimed is:

1. A method for automatic image calibration comprising the steps of:

a. initializing an index i for X axis and j for Y axis, and a block number;

b. reading a pixel on As (i,j), wherein said As (i,j) representing coordinates for a skew image;

c. computing an obliquity ratio of said pixel on As (i,j);

d. determining if said obliquity ratio divided by the length of said pixel on As (i,j) has a residue less than half the length of said pixel on As (i,j);

e. when said residue is smaller than half the length of said pixel on As (i,j), executing first calibration procedure to generate a calibrated pixel for said pixel on As (i,j), wherein said first calibration procedure follows the formula of $(A_s(i,j)*((b^2-a_1-a_4)/b^2))+(A_s(i,j-1)*(a_2/$ $b^2))+(A_s(i+1,j)*((a_3/b^2))$, wherein said b representing the length of said pixel on As (i,j), $a_1$ representing left calibration portion of said pixel on As (i,j), $a_2$ representing top calibration portion of said pixel on As (i,j), $a_3$ representing right calibration portion of said pixel on As (i,j), $a_4$ representing bottom calibration portion of said pixel on As (i,j);

f. when said residue is larger than half the length of said pixel on As (i,j), executing second calibration procedure to generate a calibrated pixel for said pixel on As (i,j) and incrementing said block number by one, wherein said second calibration procedure follows the formula of $(A_s(i,j)*((a_4/b^2))+(A_s(i,j+1)*(a_3/b^2))+(A(i,j-1)*((a_2/b^2)))$;

g. storing said calibrated pixel in a memory according to said block number;

h. increasing said index i and said index j by one; and i. repeating said step (b) and said step (h) until said index i is equal to a predetermined number and reading said calibrated pixels from said memory according said block number.

2. The method as claimed in claim 1, further comprising the step of:

j. dividing said memory into a plurality of blocks.

3. The method as claimed in claim 1, wherein said obliquity ratio of said pixel on As(i,j) as computed in said step (c) is determined by l tan α, wherein l representing the length of said pixel on As(i,j), α representing the angle of said pixel on As(i,j).

4. The method as claimed in claim 1, wherein said predetermined number of said step (i) indicates the last pixel of said skew image on X axis.

5. An apparatus for automatic image calibration for an optical scanner comprising:

calibration means for providing referential coordinates for a skew image:

obliquity ratio computation module for receiving coordinates information of a skew pixel, and generating an obliquity ratio of said skew pixel;

calibration module for receiving said coordinates information of said skew pixel and generating a calibrated pixel according to said obliquity ratio of said skew pixel by calibrating said skew pixel according to a first calibration procedure and a second calibration procedure, wherein said first calibration procedure follows the formula of $(A_s(i,j)*((b^2-a_1-a_4)/b^2))+(A_s(i,j-1)*(a_2/b^2))+(A_s(i+1,j)*((a_3/b^2))$, wherein said b representing the length of said pixel on As (i,j), $a_1$ representing left calibration portion of said pixel on As (i,j), $a_2$ representing top calibration portion of said pixel on As (i,j), $a_3$ representing right calibration portion of said pixel on As (i,j), $a_4$ representing bottom calibration portion of said pixel on As (i,j), wherein said second calibration procedure follows the formula of $(A_s(i,j)*((a_4/b^2))+(A_s(i,j+1)*(a_3/b^2))+(A(i,j-1)*((a_2/b^2)))$;

memory means for storing said calibrated pixel according to a block number; and output means for reading said calibrated pixel according to said block number.

6. The apparatus as claimed in claim 5, wherein said memory means comprises a plurality of blocks for storing said calibrated pixels according to said block number.

7. The apparatus as claimed in claim 5, wherein said obliquity ratio of said skew pixel is determined by l tan α, wherein l representing the length of said skew pixel, α representing the angle of said skew pixel.

8. A method for automatic image calibration comprising steps of:

a. initializing an index i for X axis and j for Y axis, and a block number;

b. reading a pixel on As (i, j), wherein said As (i,j) representing coordinates for a skew image;

c. computing an obliquity ratio of said pixel on as (i,j), wherein said obliquity ratio is determined by l tan α, l representing the length of said pixel on As(i,j), α representing the angle of said pixel on As(i,j);

d. determining if said obliquity ratio divided by the length of said pixel on As (i,j) has a residue less than half the length of said pixel on As (i,j);

e. when said residue is smaller than half the length of said pixel on As (i,j), executing first calibration procedure to generate a calibrated pixel for said pixel on As (i,j);

f. when said residue is larger than half the length of said pixel on As (i,j), executing second calibration procedure to generate a calibrated pixel for said pixel on As (i,j) and incrementing said block number by one;

g. storing said calibrated pixel in a memory according to said block number;

h. increasing said index i and said index j by one; and i. repeating said step (b) and said step (h) until said index i is equal to a predetermined number and reading said calibrated pixels from said memory according said block number.

9. The method as claimed in claim 8, further comprising the step of:

j. dividing said memory into a plurality of blocks.

10. The method as claimed in claim 8, wherein said first calibration procedure follows the formula of $(A_s(i,j)*((b^2-a_1-a_4)/b^2))+(A_s(i,j-1)*(a_2/b^2))+(A_s(i+1,j)*((a_3/b^2))$, wherein said b representing the length of said pixel on As(i,j), $a_1$ representing left calibration portion of said pixel on As(i,j), $a_2$ representing top calibration portion of said pixel on As(i,j), $a_3$ representing right calibration portion of said pixel on As(i,j), $a_4$ representing the bottom calibration portion of said pixel on As(i,j).

11. The method as claimed in claim 8, wherein said second calibration procedure follows the formula of $(A_s(i,j)*((a_4/b^2))+(A_s(i,j+1)*(a_3/b^2))+(A(i,j-1)*((a_2/b^2)))$, wherein said b representing the length of said pixel on As (i,j), $a_1$ representing left calibration portion of said pixel on As (i,j), $a_2$ representing top calibration portion of said pixel on As (i,j), $a_3$ representing right calibration portion of said pixel on As (i,j), $a_4$ representing bottom calibration portion of said pixel on As (i,j).

12. The method as claimed in claim 8, wherein said predetermined number of said step (i) indicates the last pixel of said skew image on X axis.

\* \* \* \* \*